(12) United States Patent
Jensen

(10) Patent No.: US 8,405,314 B2
(45) Date of Patent: Mar. 26, 2013

(54) TUBULAR LED LIGHT SOURCE

(75) Inventor: Allan Krogh Jensen, Vanlose (DK)

(73) Assignee: Danish LED Invest ApS, Brondby (DK)

( * ) Notice: Subject to any disclaimer, the term of this patent is extended or adjusted under 35 U.S.C. 154(b) by 401 days.

(21) Appl. No.: 12/304,422

(22) PCT Filed: Jun. 1, 2007

(86) PCT No.: PCT/DK2007/000261
§ 371 (c)(1),
(2), (4) Date: Feb. 19, 2009

(87) PCT Pub. No.: WO2007/143991
PCT Pub. Date: Dec. 21, 2007

(65) Prior Publication Data
US 2009/0200950 A1 Aug. 13, 2009

(30) Foreign Application Priority Data

Jun. 12, 2006 (DK) .................................. 2006 00790

(51) Int. Cl.
*H01J 7/44* (2006.01)
*H01J 1/02* (2006.01)
(52) U.S. Cl. ............................................. 315/51; 313/46
(58) Field of Classification Search .................. 315/32, 315/33, 51; 362/95, 217.01, 218, 227, 249.01, 362/249.02, 249.06; 313/46
See application file for complete search history.

(56) References Cited

U.S. PATENT DOCUMENTS 6,815,724 B2 * 11/2004 Dry .................................. 257/88
7,249,865 B2 * 7/2007 Robertson ...................... 362/228
(Continued)

FOREIGN PATENT DOCUMENTS

DE 298 17 609 U1 1/2000
DE 199 22 176 A1 11/2000
(Continued)

OTHER PUBLICATIONS

Extended European Search Report for corresponding EP Appl. No. 0772 2638, European Patent Office, mailed Oct. 7, 2010, 6 pgs.
(Continued)

*Primary Examiner* — Thienvu Tran
(74) *Attorney, Agent, or Firm* — Sterne, Kessler, Goldstein & Fox P.L.L.C.

(57) ABSTRACT

A tubular LED light source, based on a tube manufactured in a heat conducting material (1). The LED's (2) are mounted on a part of the outer surface of the tube. Thereby they conduct their heat to the tube, which transfers the heat to the surroundings by cooling fins (6) located on the other part of the outer surface of the tube. Inside the tube the control electronic (7) is placed. It is electrically connected with the LED's on the outer surface of the tube, and with connectors (10) in each end of the tube. The connectors makes it possible to install the light source in existing fluorescent tube fittings, as a direct replacement for fluorescent tubes. There is vacuum (20) inside the tube, so that no damaging condensed water is generated in cold environments. The control electronics can turn on/off and adjust the light level from LED's, and adjust the color components (RGB) of the light. Hereby different color temperatures can be generated. The light source has sensors for detection of movements in the surroundings, and for measuring the spectrum of the light, in the surroundings. The control electronics can communicate with other light sources or a central control unit, by the existing power cable. Further it can be log informations about the operation of the light source too, for further analysis. Instead of ordinary LED's, organic LED's (OLED) can be used.

13 Claims, 4 Drawing Sheets

U.S. PATENT DOCUMENTS

Figure 1:
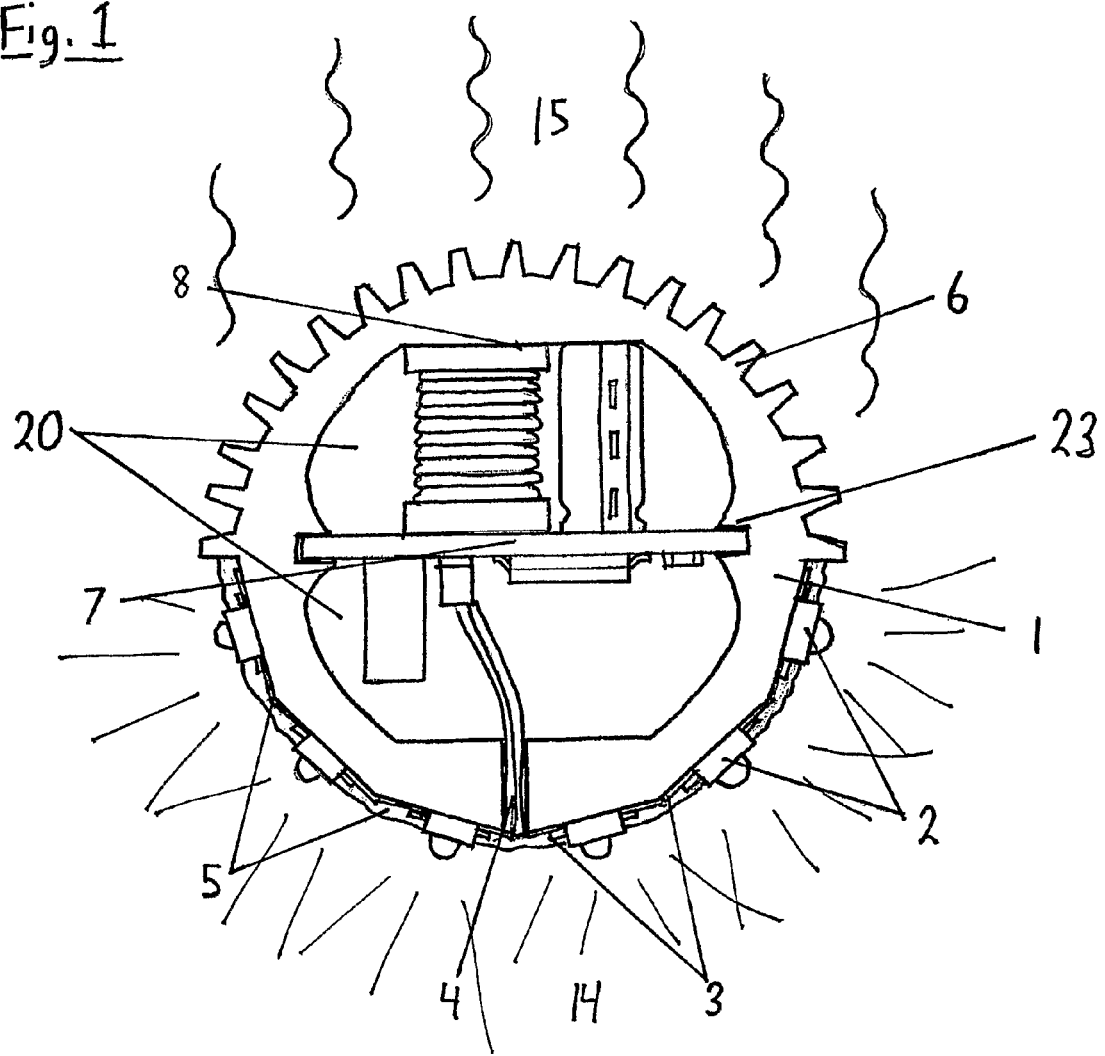

| | | | |
|---|---|---|---|
| 2002/0125839 A1* | 9/2002 | Yen | 315/291 |
| 2004/0012959 A1* | 1/2004 | Robertson et al. | 362/247 |
| 2005/0189554 A1 | 9/2005 | Dry | |
| 2005/0281030 A1 | 12/2005 | Leong et al. | |
| 2009/0261706 A1* | 10/2009 | Sorella et al. | 313/46 |

FOREIGN PATENT DOCUMENTS

| | | |
|---|---|---|
| DE | 200 13 605 U1 | 12/2000 |
| DE | 102 39 347 A1 | 3/2004 |
| RU | 19132 U1 | 8/2001 |
| RU | 2005119149 A | 1/2006 |
| WO | WO 2004/047498 | 6/2004 |
| WO | WO2004/097291 A1 | 11/2004 |
| WO | WO 2006/063212 A2 | 6/2006 |

OTHER PUBLICATIONS

International Search Report for PCT/DK2007/000261, the Swedish Patent Office, mailed Mar. 10, 2007, 3 pgs.

* cited by examiner

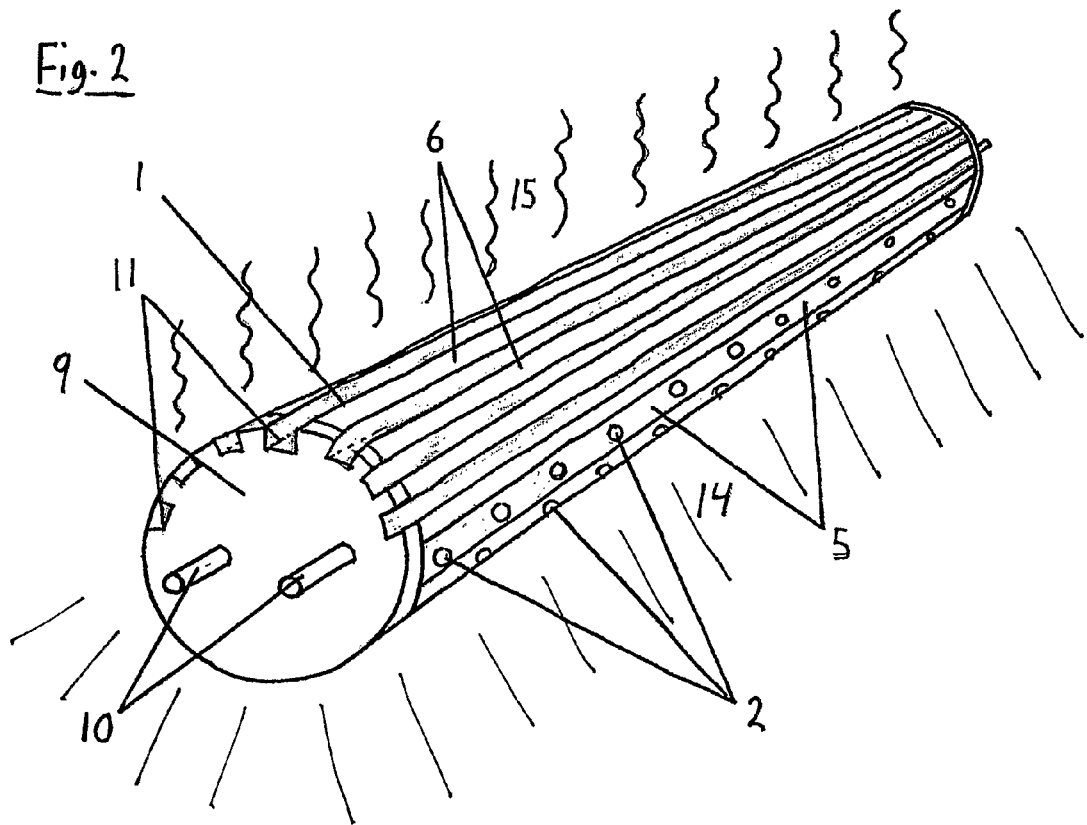
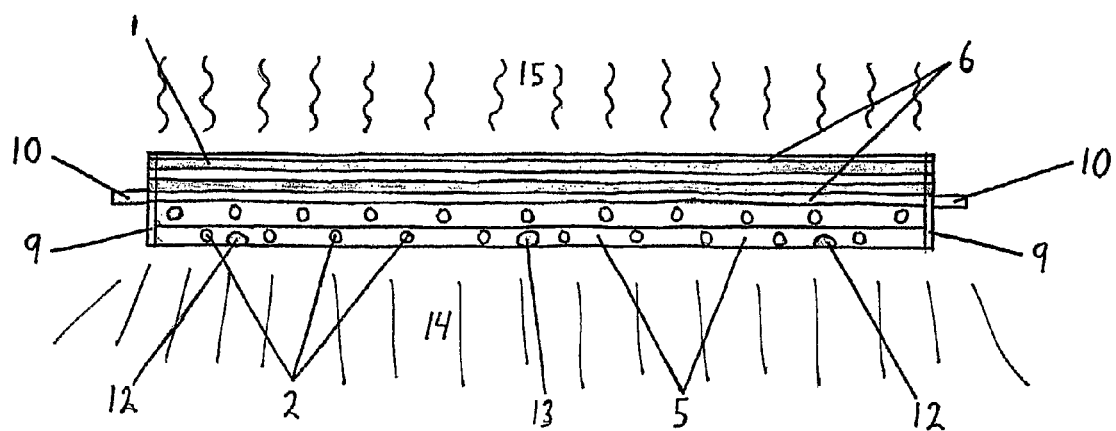

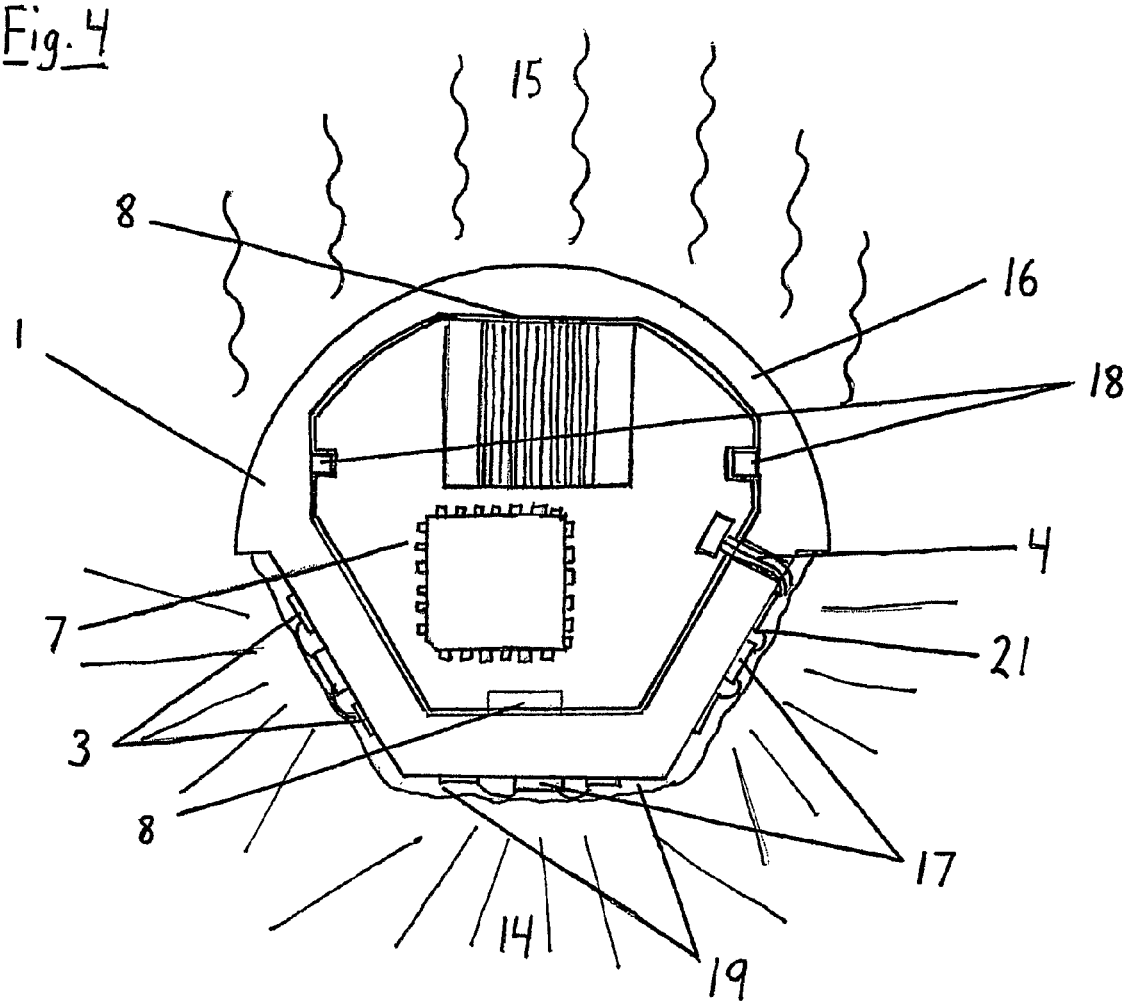

TUBULAR LED LIGHT SOURCE

FIELD OF THE INVENTION

The invention relates to a new type of light source for replacement of fluorescent tubes. It is based on light emitting diodes (LED's) and can be inserted in existing fittings for fluorescent tubes. Because of the LED-technology and an intelligent embedded controller, the light source has a number of advantages compared to fluorescent tubes. Like other LED light sources the advantages for instance includes: low energy consumption and markedly longer lifetime. The efficiency of the LED's is highly dependent of that their temperature is kept as low as possible. Therefore the presented light source efficiently transfers the heat away from the LED's. The embedded intelligent control also contribute to lower the energy consumption of the light source, by constantly taking care of that only the absolutely necessary amount of light is emitted.

THE STATE OF ART

There already exists a number patents describing LED based light sources for replacement of fluorescent tubes. Common for all of them is that they consist of a transparent tube, with the LED's mounted inside. In the ends of the tube there are connectors so that it can be inserted into a fluorescent tube fitting. The following patents describes this configuration: US2005281030, US2003102810, US2004189218, US2004095078, CN1707153, and my own EP1618331. They all have the LED's mounted along the whole length of the tube and in all directions, so that light is emitted all around the tube in an omnidirectional pattern. Other patents like WO2005017966 and US2004156199 have the LED's mounted in the ends of the tube, projecting the light against the middle of the tube. By using optics the light is then distributed all over the tube.

US2002060526 and US2005225979 only emits light from a limited part of the surface of the tube. It is done by using reflectors or by just having the LED's pointing in the desired direction.

An example of a LED light source not directly targeted against replacing fluorescent tubes is US2002125839. It considers the thermodynamics a bit more, since heat sinks are mounted on the backside of the LED's. However both the LED's and the cooling fins are still encapsulated inside a transparent tube.

Concerning an embedded controller the light source described in patent US2005281030, has embedded sensors for detection of daylight level and a movement-sensor for detection of persons. The sensors communicate with an embedded computer which can control the illumination level. The computer can also communicate with other light sources of same type or with a PLC (Programmable Logic Controller). All communication can be implemented by an extra special cable or wireless.

Concerning control of the color temperature of the light, there already exists a number of LED light sources with this feature. They function by mixing the light from red, green and blue (RGB) LED's. The following patents describes such light sources: TW226791B, WO2005030903, US2005157515, DE102004002398 og CN1619810. None of them relate to replacement of fluorescent tubes.

THE ADVANTAGES OF THE PRESENT INVENTION COMPARED TO STATE OF ART

All of the known LED based light sources for replacement of fluorescent tubes, are constructed to look like a fluorescent tube as much as possible, it is not necessary. They are encapsulated inside a transparent tube which, beside of the cosmetic effect, actually only serves as protection of the electronics inside the tube. The solution with a transparent tube has some very essential disadvantages: The tube works like a greenhouse, where the LED's and the electronics inside the tube have no chance to get rid of the heat. The heat is accumulated and the efficiency of the LED's decreases proportional to the time the light source has been turned on. Another disadvantage with the transparent tube is that a part of the emitted light is absorbed in the tube. Thereby light is lost and the total efficiency of the light source is decreased even more.

The present invention do not have the stated disadvantages. Here the LED's (2) are mounted on the outside surface of a heat conducting tube (1). Thereby the heat from them is distributed allover the surface of the tube. The heat conducting tube is in direct contact with the ambient air of the light source, where to the heat (15) is easily transferred. The control electronics (7) is mounted inside the tube, thermically connected to the tube (8), hereby the heat from said electronics efficiently can be transferred to the tube. Because of the LED's (2) being mounted on the outside of the tube, the light (14) is emitted directly to the surroundings. The LED's are still sufficiently protected since the electrical connections are enclosed into an electrically isolating material (5), which is also thermically conducting.

The existing light source (US2005281030) with a kind of intelligent embedded control, which is also based on a transparent tube, has embedded light sensors only for detection of the light level. The light sensors (12) in the present invention, detects the whole spectrum of the light in the surroundings. This means that not only the illumination level but the overall light quality in the surroundings can be detected. Light quality is defined as color temperature and illumination level.

In the patent US2005281030, communication between light sources and/or a central PLC, is mentioned. The communication can be implemented by a special separate cable or wireless. None of these methods are optimal in this application. Wireless communication uses relatively much energy, not just when it is used but also in standby mode, to be ready for communication. This is not optimal in an application targeted for energy savings. To introduce an extra cable, which shall connect each fitting/tube in an illumination system, increases the cost of the application even more. It also makes it more difficult to install. Therefore this is not a good solution. The present invention solves the communication problem by using the existing installed power cable as communication line. Modulated signals, which does not disturb the power line, are then transmitted over the cable. Further this solution requires no new installations and the energy consumptions is kept at a minimum.

The color temperature, which is one of the major disadvantages of the traditional fluorescent tube, and one of the reasons why the incandescent bulb is still on the market, has not been improved in the known LED based light sources for replacement of fluorescent tubes. Even though the LED technology makes light in any color or color temperature possible. Also the color temperature of the incandescent bulb. The present invention makes benefit of this. It can be configured to any color temperature.

THE NEW TECHNICAL MEANS AND EFFECTS

The present invention differ from the existing LED based light sources for replacement of fluorescent tubes, by being based on a tube (1) manufactured in a heat conducting material, where the LED's (2) are mounted on the outside of the tube. The LED's are evenly distributed on a minor part of the outer surface on the tube. The rest of the outer surface (6) is used for diversion of the heat (15) to the surroundings. The control electronics (7) are placed inside the tube, electrically connected with the connectors (10) in the ends of the tube and the LED's (2) and the sensors (12 and 13) on the outside of the tube. The control electronics (7) is thermally connected to the tube (8). The effect is that the heat from the LED's efficiently is moved away. Thereby their temperature is kept minimal, and their efficiency increased significant. In addition there is no unnecessary loss of light, since the light is not emitted through a transparent tube, but instead directly to the surroundings. A typical transparent acrylic tube absorbs about 10% of the light.

The invention described here, off cause has connectors (10) in both ends of the tube, dimensioned so that they fit into the sockets of an existing fluorescent tube fitting. The effect is that the invention can make up a direct replacement for fluorescent tubes.

The endpieces (9) at the ends of the tube, where the connectors (10) are located, seals the tube tight. The connections (4) from the control electronics (7) inside the tube to the LED's (2) on the outside, are also sealed. Inside the tube all air are sucked out so that there is a vacuum (20). The effect is that the electronics inside the tube is protected against condensed water and the damages this may generate. Thereby the light source is also able to function in very cold surroundings.

The control electronics (7) can log all informations concerning the operation of the light source. As examples: when and how the light is turned on/off or adjusted, or when the sensors detects a person in the room. The informations can be stored in a database. The control electronics can extract statistics from the database/log, and thereby analyse the usage patterns. The purpose of this is an overall minimization of the light usage.

The embedded control electronics can communicate with other light sources of the same type, or a central control unit, on the same illumination system. The communication takes place on the existing installed power cable, which already connects all the fittings in the illumination system. The communication do not disturb the power line, since it operates in another frequency band, and has a much lower amplitude. The communication can as an example be implemented by DTMF-modulation, which is used in telephone networks to transmit numbers. Another more advanced method for communication could be Powerline Networking, which in principle is Ethernet transmitter over the power line. Both technologies are already highly developed standards. The effect is that the light sources in an illumination system, which originally were controlled by a central switch, now becomes individual light sources capable of turning on/off and adjust their light output individually. The commands can be send by the light sources or by a central control unit. This increases the flexibility and the opportunity of energy saving significant. As an example a warehouse, where there in principle only need to be light where the fork lift trucks works. The present invention makes it possible only to have light at these locations. The fork lift trucks can be detected by the embedded sensors of the light sources. By communicating with the nabour light sources, the light sources can generate an illuminated area around the fork lift trucks. Thereby a lot of illumination and energy can be saved. The LED's in the present invention can be turned on/off or adjusted immediately, without any problems or damages on the light source.

The present invention has one or more embedded sensors (12) for detection of the light quality in the surroundings. The sensors measure the contribution of light from the daylight or other artificial light sources. Detection of light quality means detection of the whole spectrum distribution in the visible light band. From this not only the light level, but also the color temperature can be derived. The sensors communicates with the embedded control electronics. The effect is that the light source is capable of adjusting the total light level in its surroundings. Thereby the light source only uses exact the amount of energy needed to keep up the required light quality in the surroundings.

The present invention has embedded movement sensors (13). They might be of the well known type PIR (Passive Infrared). They can detect warm objects such as persons or vehicles, in the illumination area of the light source. The sensors communicate with the embedded control electronics. The effect is, as earlier mentioned, that the light source can be turned on when it is needed, and turned off when not.

Instead of using normal LED's in the present invention, a special kind of LED's called organic light emitting diodes (OLED) can be used. The effect is a more homogeneous illumination and a more compact design, and may be in the future a more attractive light source.

The embedded control electronics (7) has functionality to adjust the light level. Either general or specific for each of the color components: Red, Green and Blue (RGB). The effect is that light in any color temperatures or colors can be emitted.

The LED's (2) which are mounted on the outside of the tube may consist of different groups. Each group represents a direction of illumination. Each group can be controlled individually. The effect is that illumination direction of the light source becomes dynamic, and can be changed electronically. This gives an opportunity for further energy savings, and decorative effects. As an example a lecture room with large windows with a lot of daylight input. As the day progresses and the daylight changes angle and strength, the light source can compensate for this by changing the illumination direction and light level. Thereby the black boards and the desks always receives the required amount of illumination.

DRAWING

Figure 5:
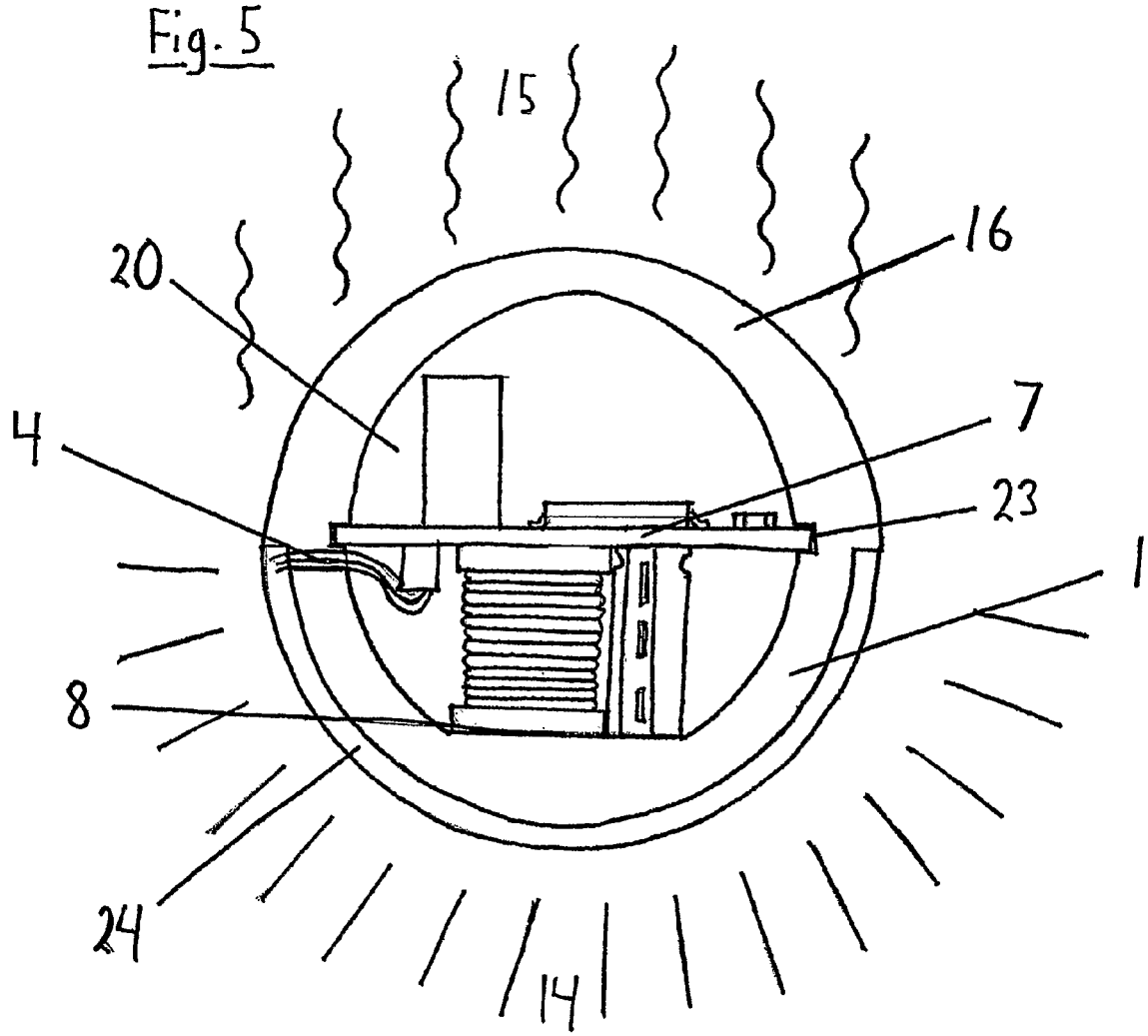

FIG. 1 shows a cross section of the light source
FIG. 2 shows the light source as seen from the end
FIG. 3 shows the light source as seen from the side
FIG. 4 shows an alternative design of the light source
FIG. 5 shows an another alternative design of the light source

A PREFERRED EMBODIMENT OF THE INVENTION

The present light source can be based on an specially extruded aluminiumtube (1). It is shaped so that the one half side, has a surface like a regular polygon, with 6 edges (see FIG. 1). On the other half side, the surface area consists of cooling fins (6), to maximize the convection of heat (15). On each edge of the polygon SMD LED's (2) are mounted, emitting light (14) in directions perpendicular to the edges of the polygon. The terminals of the SMD LED's are connected electrically to thin printed circuit boards (PCB) (3), taking care of elctrical connections between each LED. The back side of the LED's are thermally connected to the aluminum tube. To protect and isolate the electrical connections on the outside of the tube, the terminals of the SMD LED's and the PCB's are potted into a heat conducting epoxy compound (5). The PCB's on the outside of the tube are connected by wires (4) to the embedded control electronics (7) inside the tube. The wires goes through holes in the tube, which are also sealed with an epoxy compound. On the inside of the tube there are two grooves (23), where the PCB containing the control electronics (7) is to be mounted. The heat generating components (8) of the control electronics, is thermally connected to the aluminiumtube. In each end of the tube there is a tight-fitting endpiece (9), with connectors (10), dimensioned so that they fit into a fluorescent tube fitting. The profile of the cooling fins on the tube, continues in the endpieces (11). This is done to improve the air stream along the cooling fins, especially when the tube is mounted in a vertical fitting. Inside the tube there is vacuum (20) in order to avoid condensed water, which could damage the control electronics. Along the tube the LED's are evenly distributed, to make the illumination homogeneous (see FIG. 2). The sensors for detection of movement (13) and spectrum distribution of the light (12), are placed outside the tube, also connected to the control electronics inside the tube.

A SECOND PREFERRED EMBODIMENT OF THE INVENTION

In another preferred embodiment the design of the light source is shown on FIG. 4. The aluminiumtube (1) is still shaped like a regular polygon on one half side. The number of edges depends on the requested angle of illumination of the light source, as well as the radiation pattern of the LED's.

In this case 3 edges are enough. On the other half side of the tube, the surface is curved (16). This will give enough surface area to cool down the tube, as the LED's becomes more efficient by time. Thereby the curve functions as the heat sink. On each edge of the polygon-side there are still LED's evenly distributed. This time not as SMD-components, but as raw LED-chips (17) in order to minimize the cost, the LED-chip is thermically connected to the aluminiumtube and electrically bonded directly to the PCB (3) by thin wires (21). It is all sealed into a transparent heat conducting epoxy compound (19). Inside the tube the control electronics (7) is distributed on a number of stacked PCB's. The PCB's are kept in place by some rails (18) inside the tube. The rest of the implementation of the light source is identical with the one mentioned in the first embodiment.

A THIRD PREFERRED EMBODIMENT OF THE INVENTION

FIG. 5 shows a third preferred embodiment of the invention. The difference between this and the earlier mentioned embodiments, is that it instead of using a number of discrete LED's, uses one module (24) consisting of a number of organic light emitting diodes (OLED).

The invention claimed is:

1. A tubular LED light source comprising:
    a hollow tube manufactured from a heat conducting material so that heat is diverted to the surroundings, wherein the hollow tube is in direct contact with ambient air surrounding the light source;
    LEDs mounted and evenly distributed on an outside surface of the hollow tube;
    control electronics placed inside the hollow tube and electrically connected to the LEDs;
    connectors located at ends of the light source, wherein the connectors are electrically connected to the control electronics and are dimensioned to fit into standard sockets for fluorescent tubes; and
    a plurality of cooling fins on the outside surface of the hollow tube.

2. A tubular LED light source according to claim 1, wherein there is vacuum inside the hollow tube.

3. A tubular LED light source according to claim 1, wherein the control electronics is arranged to store information about the operation of the light source, and analyze the information to minimize energy consumption.

4. A tubular LED light source according to claim 1, wherein the control electronics is arranged to communicate, with other light sources or a central control unit, by an existing installed electric power cable.

5. A tubular LED light source according to claim 4, wherein the control electronics communicate using modulated signals.

6. A tubular LED light source according to claim 1, further comprising one or more embedded sensors to measure the spectrum of the light from the surroundings.

7. A tubular LED light source according to in claim 1, further comprising one or more embedded sensors to measure movements in the surroundings of the light source.

8. A tubular LED light source according to claim 7, wherein the sensors are of the passive infrared type for detecting persons or vehicles.

9. A tubular LED light source according to claim 1, wherein on the outside surface of the hollow tube, one or more organic light emitting diodes (OLED) are mounted.

10. A tubular LED light source according to claim 1, wherein color components (Red, Green, Blue), in the emitted light, can be adjusted individually.

11. A tubular LED light source according to claim 1, wherein an illumination area of the light source can be adjusted, by turning on/off or dimming some of the LEDs.

12. A tubular LED light source according to claim 1, wherein the heat conducting material is aluminum.

13. A tubular LED light source according to claim 1, wherein the control electronics are thermally connected to the tube.

* * * * *